United States Patent [19]

Tufty

[11] Patent Number: 4,676,672

[45] Date of Patent: Jun. 30, 1987

[54] PRECISION SPINDLE

[75] Inventor: Lyle R. Tufty, Elgin, Minn.

[73] Assignee: International Business Machines Corporation, Armonk, N.Y.

[21] Appl. No.: 878,387

[22] Filed: Jun. 19, 1986

Related U.S. Application Data

[63] Continuation of Ser. No. 703,238, Feb. 19, 1985, abandoned.

[51] Int. Cl.$^4$ .................. F16C 35/063; B25G 3/00
[52] U.S. Cl. .................................. 384/537; 384/385; 403/248
[58] Field of Search .............. 403/248, 277, 362; 384/510, 537, 538, 540, 559, 560, 562, 584, 585

[56] References Cited

U.S. PATENT DOCUMENTS

| | | | |
|---|---|---|---|
| 608,178 | 8/1898 | Cock | 403/274 X |
| 2,279,593 | 4/1942 | Myers | 403/375 |
| 3,664,258 | 5/1972 | Vecchi | 100/214 |
| 3,670,315 | 6/1972 | Fowler | 360/97 |
| 3,776,651 | 12/1973 | Peter et al. | 403/248 |
| 4,059,180 | 11/1977 | Krivec et al. | 193/37 |
| 4,531,847 | 7/1985 | F'Geppert | 384/519 |

FOREIGN PATENT DOCUMENTS

| | | | |
|---|---|---|---|
| 660546 | 5/1938 | Fed. Rep. of Germany | 403/248 |
| 1018697 | 4/1955 | Fed. Rep. of Germany | . |
| 1446907 | 6/1966 | France | 384/585 |
| 2528977 | 6/1982 | France | . |
| 548690 | 10/1942 | United Kingdom | . |

Primary Examiner—Stanley N. Gilreath
Assistant Examiner—David Werner
Attorney, Agent, or Firm—Bradley A. Forrest

[57] ABSTRACT

A spindle assembly has a shaft with at least two axially spaced expandable shaft sections. The expandable shaft sections serve to couple the spindle to a bearing assembly having inner races. The expandable shaft sections are expanded elastically and uniformly into retentive contact with the inner races to provide radial and axial support for the spindle assembly.

40 Claims, 1 Drawing Figure

PRECISION SPINDLE

This is a continuation of application Ser. No. 703,238 filed 02/19/85 now abandoned.

BACKGROUND OF THE INVENTION

The present invention relates to precision spindle assemblies and in particular to a spindle shaft for coupling to a bearing assembly.

Spindle assemblies for data disk drive devices have data disks attached and rotate the disks at fairly high rates compatible with reading and writing data and to reduce data access time. Precision spindle assemblies are required to rotate the disks accurately because of ever increasing data track densities and increasing linear bit densities. As these data densities continue to rise, particular importance is placed on the spindle performance as measured by the magnitude of the repeatable radial run-out. With high run-out, the data reading and writing heads need to be moved radially to follow the data tracks as the disks rotate. Radially moving the head to follow the data track becomes more and more complex as greater accuracy is required with increased data densities. One of the greatest contributors to run-out is the clearance between the outer diameter of the spindle shaft and the inner race of the bearing assembly.

Prior approaches to reduce the run-out involve the use of press fits between bearing assemblies and shafts, shims, or the use of adhesives to bond bearings to shafts while oriented in precision fixtures. The data disks are then formatted. Further efforts to reduce the run-out included selective assembly techniques such as the use of matched pairs of bearing assemblies. These procedures are expensive and time consuming.

In United Kingdom Pat. No. 548,690, U.S. Pat. Nos. 3,776,651 to Peter et al. and 608,178 to Cock, expansion of sleeves to grip workpieces, hubs and rails respectively are shown. In U.S. Pat. No. 3,670,315 to Fowler, an expandable collet attached to a spindle is expanded to hold a memory disk assembly to the spindle. Expansion techniques are not known to have been used to secure a spindle shaft to the inner races of a bearing assembly.

SUMMARY OF THE INVENTION

A precision spindle assembly has a spindle shaft which is to be disposed between two widely spaced bearing assemblies. The spindle shaft has a diameter slightly less than the diameter of the inner races of the bearing assemblies. The spindle shaft has radially expandable sections located where the spindle shaft contacts the inner races of the bearing assemblies when assembled. The expandable sections of the spindle shaft are uniformly expanded within their elastic regions into friction contact with the inner races of the bearing assemblies. The uniform and repeatable expansion of the spindle shaft provides virtually zero radial repeatable run-out due to the spindle shaft to inner race interface.

The expandable sections of the spindle shaft are part of a bore through the shaft and are conical in shape. The expandable sections are preferably concentric with the outer surface of the spindle shaft and opening outward from the bore toward the respective ends of the spindle shaft. A spherical surface such as an inexpensive ball bearing is forced into the conical sections by means of a set screw having threaded portions which engage threaded portions of the bore at each end of the bore. The set screws each have a flat surface acting on the balls to minimize transmission of rotational force from the screws to the balls. The forcing of the balls into the conical sections cause the spindle shaft to uniformly expand into contact with the inner races of the bearing assemblies. The torque applied to the set screws is sufficient to create axial and radial retentive force between the expanded spindle shaft and the inner races of the bearing assemblies. These retentive forces are all that are required to maintain the spindle shaft in desired position within the bearing assemblies.

In one preferred embodiment, data disks are coupled to the spindle assembly. The spindle assembly is then coupled to the bearing assemblies via the expandable sections of the spindle shaft. Since the spindle shaft expands uniformly about the shaft axis of rotation, and virtually no radial run-out is introduced by the shaft to inner race interface, the data disks are formatted and balanced prior to the spindle assembly being assembled into the bearing assemblies. The bearing assemblies are coupled to a base casting which contains the reading and writing heads which used to be used for the formatting activity. The formatting activity was by far the most time consuming task during manufacture of disk drives because the reading and writing heads and arms to move the heads are suitable for customer use, but faster is available for production use. By using the faster writing apparatus to format disks on spindle assemblies in parallel to the main manufacturing line, prior to assembly of the spindle assemblies in the base casting, the manufacturing time for disk drives is greatly reduced, and the capacity of the line increased.

Besides the benefit of vastly reduced radial repeatable run-out, the uniform and repeatable expansion of the spindle shaft decreased rotational imbalances in the spindle assembly by eliminating imbalances caused by securing the spindle shaft to the bearings. The uniformity of expansion of the shaft assures an axis of rotation which is concentric with the expanded outer surface of the spindle shaft. Hence, efforts to reduce vibrations, such as balancing of the disks, are taken prior to assembly of the spindle assembly in the base casting while accessibility is easier.

A further benefit realized from the spindle shaft expansion is the elimination of bearing biasing springs which take up play in bearing assemblies. A cylindrical spacer is placed between the outer races of the bearing assembly, and a preload force is applied against the inner races. The expandable shaft sections are then expanded into retentive contact with the inner races of the bearing assemblies. This effectively takes up the play in the bearing assemblies without the use of a spring.

BRIEF DESCRIPTION OF THE DRAWING

The FIG. is a vertical axial section of a precision spindle shaft in a bearing assembly, said spindle shaft having axially spaced expandable sections for connection to the bearing assembly.

DETAILED DESCRIPTION

Figure 1:
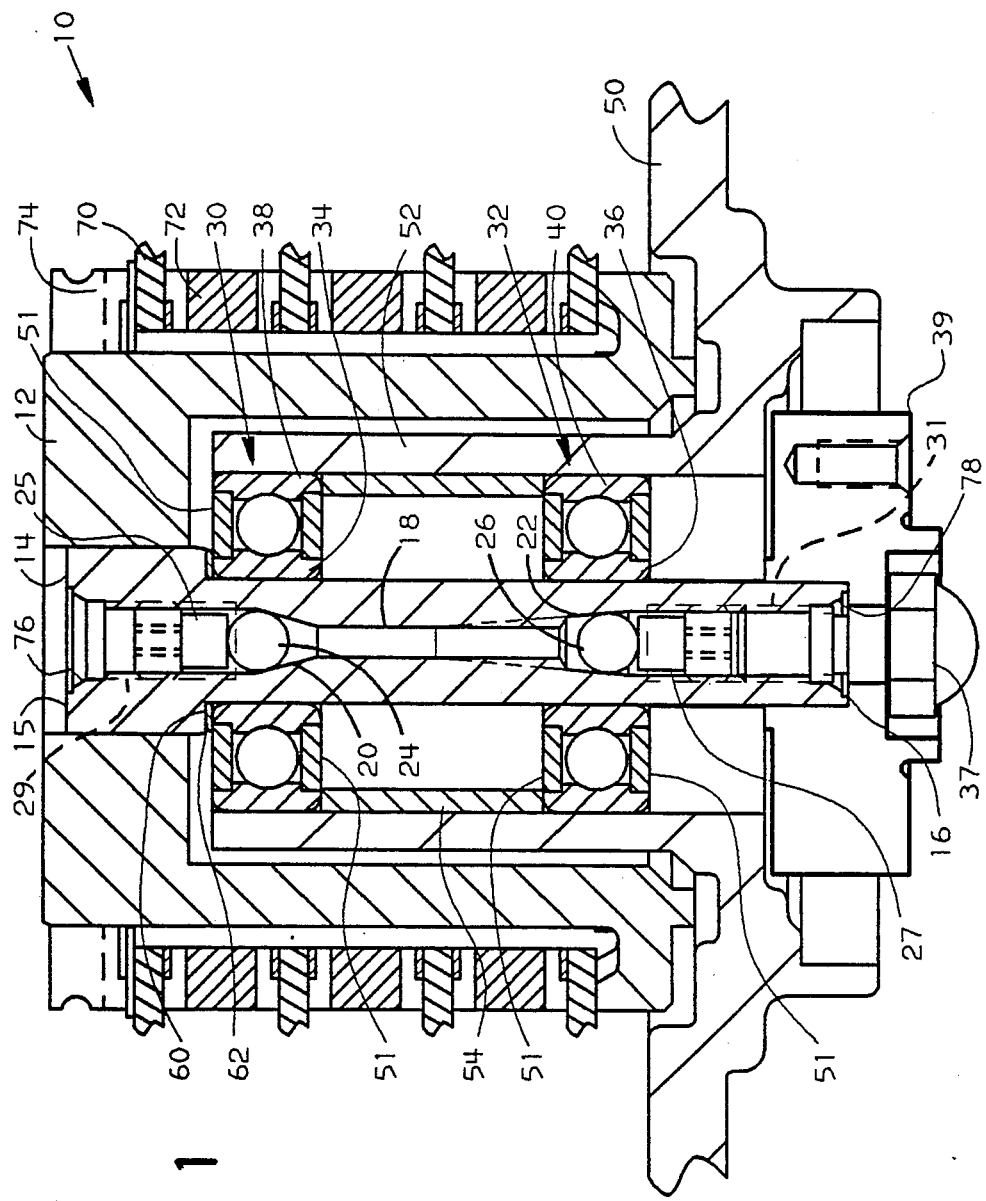

A disk drive assembly is indicated generally at 10 in the FIGURE. A spindle assembly 12 disposed within disk drive assembly 10 has a spindle shaft 14 having a first end 15 and a second end 16. Spindle shaft 14 has a bore 18 bored therethrough with a first concial section 20 axially spaced froma second conical section 22. The conical sections 20 and 22 open fromt he bore 18 toward the first end 15 and second end 16 respectively.

A first shaft expanding means such as a ball 24, operating in conjunction with a set screw 25, is positioned in the first conical section 20 for causing expansion of the shaft outer surface about the area of conical section 20. A second shaft expanding means such as a ball 26, operating in conjunction with a set screw 27, is positioned in the second conical section 22 for causing expansion of the shaft outer surface about the area of conical section 22. The first and second set screws 25 and 27 have threads which interact with corresponding threads 29 and 31 in the bore 18 about each end of the shaft 14. The first and second set screws 25 and 27 are positioned toward the first and second ends 15 and 16 of shaft 14 from the first and second balls 24 and 26 respectively. Tightening of the set screws 25 and 27 as by an Allen wrench cause the first and second balls 24 and 26 to be forced in an axial direction into the narrower portions of their respective conical sections 20 and 22 to uniformly radially expand the spindle shaft 14 about the conical sections within the shaft's elastic region. The balls 24 and 26 also serve as check balls to prevent the movement of air through the bore 18.

The spindle shaft 14 is inserted into a first bearing assembly 30 and a second axially spaced bearing assembly 32. First and second bearing assemblies 30 and 32 comprise a first inner race 34 and a second inner race 36 respectively. The conical sections 20 and 22 are expanded into frictional contact with the first and second inner races 34 and 36. The expansions are caused by turning the respective set screws 25 and 27 in the appropriate direction to force the balls 24 and 26 into the conical sections 20 and 22. The inner races 34 and 36 circumferentially directly contact the spindle shaft 14 about its expanded sections. The spindle shaft 14 has a diameter which is only slightly smaller than the diameter of the inner races 34 and 36 of the bearing assemblies 30 and 32 so that the spindle shaft 14 maintains axial and radial retentive force when expanded within the spindle shaft's elastic limits. A stud 37 is coupled to the shaft 14 via threaded portion 31 for providing an interface 39 to a motor which provides rotational energy to the spindle assembly 12.

The bearing assemblies have first and second outer races 38 and 40 which are coupled as by adhesive or press-fits to a base casting 50 preferably prior to insertion of the spindle shaft 14. The bearing assemblies 30 and 32 are sealed by a plurality of annular seals 51 extending between the inner and outer races of the bearing assemblies. The outer races 38 and 40 are coupled to the base casting 50 on the inner surfaces of a cylindrical base casting tower 52 which is mounted on the base casting 50. A cylindrical spacer 54 is positioned adjacent the inner surface of the base casting tower 52 and between the outer races 38 and 40 of the bearing assemblies 30 and 32 to maintain desired spacing and parallelism between the bearing assemblies 30 and 32.

During expansion of the spindle shaft 14, the spindle shaft 14 is pulled toward its second end 16 by threaded portion 31, while equal force is applied toward first end 15 on the inner race 36 of second bearing assembly 32. These forces are applied by means of a first hollow cylinder (not shown) having external threads mating with threaded portion 31 and a second larger hollow cylinder concentric with the first cylinder and having an end mating with the inner race 36. These cylinders are coupled by a spring so that as the inner cylinder is screwed into threaded portion 31, the second cylinder exerts the desired force toward the first end of shaft 14 on second bearing 32.

Spindle shaft 14 has a lip 60 contacting inner race 34 of the first bearing assembly 30 through an annular spacer 62. Pulling spindle 14 toward its second end 16 while pushing the second bearing assembly 32 toward the first end 15 forces the first bearing assembly 30 and the second bearing assembly 32 together. When the spindle shaft 14 is expanded into axial and radial retentive contact with the inner races 34 and 36, the bearing assemblies 30 and 32 are in a preloaded condition and slack in the bearing assemblies is taken up, reducing axial run-out without the use of a spring.

By having the spacer 54 acting on the outer races 38 and 40 of the bearing assemblies 30 and 32 as opposed to the inner races 34 and 36, the squareness of the beraing assemblies 30 and 32 is enhanced. When spacers are contacting the inner races, differences in size of the spacer from nominal show up as almost twice the difference at the outer races. The ability to move the spacer 54 to contact the outer races 38 and 40 results in a one to one translation of differences in size of the spacer 54 from nominal. The accurate squareness of the bearing assemblies 30 and 32 still further reduces run-out.

In one preferred embodiment, the spindle assembly 12 supports a pluarlity of data disks 70 separated by spacers 72. The disks 70 and spacers 72 are fixed to the spindle assembly 12 by a clamping ring 74. The disk surfaces are preferably formatted prior to the spindle assembly 12 being coupled to the base casting 50 by the bearing assemblies 30 and 32. Formatting of the disks 70 prior to assembly of the spindle assembly 12 to the base casting 50 is possible because of the uniformity of expansion of the spindle shaft 14 into the inner races 34 and 36 of the bearing assemblies 30 and 32. By use of the outer edges of the spindle shaft 14 as a reference or datum for a precision bore, formatting of the disks 70 can be performed using high speed data transducers or heads. Use of the bore 18 at both ends of the spindle shaft 14 where the bore 18 ic chamfered at 76 and 78 as a datum for formatting the disks 70 is also possible. In this case, a precision air bearing having a larger diameter than the bore 18 at its ends is partially inserted in the chamfers 76 and 78 to rotate the spindle assembly 12 with disks 70 about the axis of the bore 18 which is preferably substantially concentric with the outer surface of the spindle shaft.

First conical section 20 preferably has a total included angle which does not lock ball 24 into position. A total included angle of 30 degrees has been found to be nonlocking, and yet gradual enough to provide sufficient radial amplification of the axial force applied to ball 24 by set screw 25.

Second conical section 22 has a total included angle small enough to lock ball 26 into position. A total included angle of 10 degrees was found to be locking, and also provided a great enough radial amplification of the axial force applied to ball 26 by set screw 27. The radial expansion caused by balls 24 and 26 is generated with acceptable levels of torque applied to set screws 25 and 27. Greater radial force per unit of torque applied to set screw 27 is generated in the second conical section 22 because of smaller total included angle of second conical section 22. Greater retentive force at the second conical section 22 acts with the lip 60 to maintain the preload condition of the bearing assemblies. The less torque required to provide expansion, the better, because some of the torque is transmitted to the shaft and tends to twist the shaft contributing to radial run-out.

The torque actually transmitted to the spindle shaft is minimized by the design of the set screws 25 and 27 and balls 24 and 26. The set screws 25 and 27 have a flat surface acting against the balls 24 and 26. The flat surface of the set screws transmits very little rotational force or torque to the curved surface of the balls because they contact the balls over a small surface area, almost at a point, as opposed to a flat surface to flat surface interface where frictional forces would facilitate transmission of torque. The balls' interaction with the sides of the conical sections also provides less friction in an axial direction than would a mating plug. Since the balls 24 and 26 comprise a small annular cross section contacting the sides of the conical sections 20 and 22, a localized annular expansion of the spindle shaft 14 occurs from forcing the balls 24 and 26 further into the conical sections 20 and 22. Therefore, less axial force and hence, less torque is required to generate the desired outward radial force and localized expansion of the spindle shaft 14 provided by the balls 24 and 26.

Since spindle shaft 14 is not placed in high levels of axial stress or uneven radial stress, curvature of the spindle shaft is minimized. Curved shafts lead to high levels of repeatable run-out which is magnified at the disk surfaces.

To remove the expanded spindle shaft 14 from the bearing assemblies 30 and 32, first set screw 25 is loosened and removed, and the nonlocked ball 24 falls out or is pulled out with a small vacuum. The second set screw 27 is then loosened and removed and a rod is inserted from the first end 15 of shaft 14 through the bore 18 and pressed against ball 26 to remove it. The rod utilizes threads 29 for generating axial force against ball 26 to prevent damage to the bearing assemblies. Since the shaft 14 is expanded within its elastic limits, approximately 0.2 percent for 300 series stainless steel, the shaft returns to its original size and is removed from the bearing assemblies.

The clearance between the inner races 34 and 36 bearing assemblies 30 and 32 and the outside of the shaft 14 is preferably sufficient for ease of insertion and removal of the shaft 14, yet small enough so that the shaft 14 is expanded well within tis elastic limits to obtain desired axial and radial retentive forces. In the preferred embodiment, the maximum expansion required is 0.16 percent.

In a further preferred embodiment, the bearing assemblies 30 and 32 comprise ABEC Class 7 bearing assemblies specified at a maximum of 100 microinches of repeatable radial run-out. Actual measured run-out due to the bearing assemblies alone was in the range of 20 to 80 microinches. While measuring the run-out of the shaft 14 as assembled in the bearing assemblies 30 and 32, no additional asymmetry was identified. The measurements were taken toward the second end 16 of shaft 14 with a resolution of 5 millionths of an inch. The shaft 14 run-out detected was 20 to 80 microinches, the same as the run-out of the bearing assemblies, which indicates that no run-out was detected due to the shaft to bearing inner race connection.

A further advantage of the present invention comes from the uniform expansion of the shaft 14. By uniformly expanding the shaft 14, minimal contribution is made to imbalance of the spindle assembly as assembled to the base casting 50. Thus, when rotating at high speeds, little vibration if any is contributed by the spindle assembly to bearing interface.

Balancing of the spindle assembly 12 does not need to occur once the spindle assembly 12 is assembled to the base casting 50 where access to the disks is limited. Both the disk formatting and balancing, as by alternate registration of the disks and spacers, as described in a copending application assigned to the same assignee as the present application entitled: Alternately Centered Disk Pack Assembly and Method, Ser. No. 685,433 filed Dec. 24, 1984, are done prior to assembly in the base casting 50. Some of the benefits of doing this include early defect detection, ease of automation, elimination of base casting resonances during formatting, low magnetic contamination exposure because disk drive motors need not be used, and easy adaptation to new disk file formatting or servo writing procedures.

Formatting of disks after assembly of the spindle assembly 12 into the base casting 50 required the use of the writing capabilities of the disk drive assemblies. It was the most time intensive operation of manufacturing of the disk drive assemblies. Such writing capabilities are slow in comparison to advanced and more expensive writing devices. Since formatting of the disks on the spindle assembly prior to assembly of the spindle assembly 12 to the base casting 50 is now performed due to the repeatability and uniformity of the shaft 14 expansion in accordance with the present invention, the formatting is done parallel to other assembly operations on an assembly line. Utilization of the faster read write capability of advanced writing devices greatly reduces the time required to format the disks 70 thus increasing the production capability of the manufacturing line. It also makes possible the manufacture of the spindle assembly 12 and formatting of the disks 70 remote from the main disk drive 10 assembly line.

While the invention has been shown and described with reference to preferred embodiments thereof, it will be understood by those skilled in the art that various changes in form and details may be made therein without departing from the spirit and scope of the invention.

What is claimed is:

1. A precision spindle assembly for being rotatingly supported by inner races of axially spaced apart bearing assemblies, the spindle assembly comprising:
    shaft means disposed between the inner races of the bearing assemblies for rotating within the bearing assemblies, said shaft means having expandable sections adjacent the inner races of the bearing assemblies; and
    expansion means coupled to the shaft means for providing a localized annular expansion of the shaft means into localized retentive contact with the inner races of the bearing assemblies.

2. The spindle assembly of claim 1 wherein the expandable spindle sections are uniformly expandable about the inner races of the bearing assemblies.

3. The spindle assembly of claim 1 wherein the expandable spindle sections, when expanded into contact with the inner races of the bearing assemblies, provide axial retentive force with respect to the spindle assembly.

4. The spindle assembly of claim 3 wherein the expandable spindle sections have a diameter slightly less than the diameter of the inner races of the bearing assemblies such that expansion of the expandable spindle sections by the expansion means within the elastic region of expansion of the expandable spindle sections provides desired retentive forces.

5. The spindle assembly of claim 1 and further comprising at least one data disk coupled to the shaft for rotating with the shaft.

6. The spindle assembly of claim 5 wherein the data disks are formatted prior to expansion of the expandable shaft sections into contact with the inner races of the bearing assemblies.

7. A rotation imparting device subassembly for coupling to a bearing assembly to permit said subassembly to rotate, the subassembly, comprising:
- a shaft having at least two axially spaced uniformly, locally and elastically expandable shaft sections for localized annular engagement with inner races of the bearing assembly; and
- radial expansion means coupled to the shaft for providing localized annular radial force to locally expand the shaft.

8. The device of claim 7 wherein the shaft is cylindrical in shape and has a hole bored therethrough.

9. The device of claim 8 wherein the expandable shaft sections of the shaft comprise tapered conical sections opening toward the respective ends of the shaft, said conical sections being substantially concentric with the outside of the shaft.

10. The device of claim 8 wherein the radial expansion means comprise spherical surfaces in annular engagement with the inner bore of the expandable shaft sections to provide the radial force.

11. The device of claim 9 and further comprising axial force providing means coupled to the spherical surfaces for forcing the spherical surfaces into the conical section to expand the shaft.

12. The device of claim 11 wherein the conical sections are shaped to provide amplification to the axial force provided by the axial force providing means into radial forces to expand the shaft without transmission of substantial torque to the shaft.

13. The device of claim 11 wherein the axial force providing means comprise set screws having flat surfaces acting on the spherical surfaces to provide axial force transmission without substantial transmission of torque to the spherical surfaces.

14. The device of claim 13 wherein the shaft comprises threaded portions between each conical section and the ends of the shaft which mate with corresponding threaded portions of the set screws.

15. The device of claim 7 and further comprising at least one data disk coupled to the shaft.

16. The device of claim 15 wherein the data disk is formatted.

17. The device of claim 7 wherein the expandable shaft sections are expanded to engage the inner races of the bearing assemblies with axial retentive force.

18. The device of claim 7 wherein the expandable shaft sections are expanded within their elastic region of expansion to provide repeatability of expansion.

19. The device of claim 7 where the expandable shaft sections are uniformly expanded.

20. The device of claim 19 wherein the expandable shaft sections uniformly expand about the axis of rotation such that little imbalance is introduced by the subassembly resulting in few vibrations as the shaft is rotated.

21. A method of attaching a spindle to an inner race of a bearing assembly comprising the steps of:
- inserting the spindle into the inner race of the bearing assembly; and
- expanding at least one selected portion of the spindle uniformly and within its elastic region in localized annular retentive contact with the inner race of the bearing assembly.

22. A method of attaching a spindle assembly to an inner race of a bearing assembly which has preformatted disks attached thereto, comprising the steps of:
- inserting the spindle into the inner race of the bearing assembly; and
- expanding at least one selected portion of the spindle assembly into localized annular retentive contact with the inner race of the bearing assembly.

23. A disk drive assembly comprising:
- a base;
- a pair of axially spaced bearing assemblies supported by said base;
- shaft means disposed between the inner races of the bearing asseblies for rotating within the bearing assemblies, said shaft means having expandable sections adjacent the inner races of the bearing assemblies;
- a plurality of formatted data disks coupled to the shaft means; and
- expansion means coupled to the shaft means for uniformly expanding the shaft means into localized annular retentive contact with the inner races of the bearing assemblies.

24. The spindle assembly of claim 1 wherein the expansion means further comprises conversion means coupled to the shaft means for efficiently converting axial force to radial expansion force for uniformly expanding the shaft means with minimal transmission of torque to the shaft means.

25. The spindle assembly of claim 1 wherein the expansion means comprises:
- spherical surface means having spherical surfaces for contacting the expandable sections adjacent the inner races of the bearing assemblies; and
- axial force means contacting the spherical surface means for providing axial force to cause the spherical surfaces to expand the expandable sections.

26. The spindle assembly of claim 25 wherein the spherical surfaces cause a localized expansion of the expandable sections such that minimal axial force is required to provide adequate retentive contact.

27. The spindle assembly of claim 25 wherein the axial force means comprises a flat surface moving axially against a spherical surface of the spherical surface means.

28. The spindle assembly of claim 27 wherein the area at which the flat surface contacts the spherical surface is close to the axis of the shaft means.

29. The spindle assembly of claim 1 wherein the bearing assemblies further comprise outer races, the spindle assembly further comprising:
- annular spacer means disposed between the outer races of the bearing assemblies for maintaining a desired distance between the bearing assemblies.

30. The spindle assembly of claim 29 wherein the inner races are in a preloaded condition with respect to the outer races when the shaft means is expanded into retentive contact with the inner races of the bearing assemblies.

31. A precision spindle assembly for being rotatingly supported by inner races of axially spaced apart bearing assemblies, the spindle assembly comprising:

shaft means disposed between the inner races of the bearing assemblies for rotating within the bearing assemblies, said shaft means having elastically expandable sections adjacent the inner races of the bearing assemblies;

radial force providing means for contacting and expanding a local annular portion of each of the expandable shaft sections into localized retentive contact with the inner races of the bearing assembly; and axial force providing means for providing axial forces acting on the radial force providing means to cause said radial force providing means to locally expand the portions of the expandable sections of the shaft into the inner races of the bearing assembly.

32. The precision spindle assembly of claim 31 wherein the shaft means comprises axial conical bores about the inner races of the bearing assemblies opening toward the respective ends of the shaft means.

33. The precision spindle assembly of claim 32, wherein the radial force providing means comprises spheres disposed in the conical bores of the shaft means, said spheres having diameters such that the shaft means is annularly and locally expanded into respective inner races.

34. The precision spindle assembly of claim 33, wherein the localized annular expansions of the shaft means substantially follow the shape of the spheres such that the greatest expansion of the shaft means into the inner races occurs about the spheres, providing the greatest friction contact with the inner races at the point of greatest expansion.

35. The precision spindle assembly of claim 34 wherein the axial force providing means comprises set screws threadingly coupled to the shaft means, and having substantially flat surfaces contacting the spheres, and wherein turning said set screws provides axial forces moving the spheres into the conical sections.

36. The precision spindle assembly of claim 35 wherein the flat surfaces of the set screws acting on the curved surfaces of the spheres minimizes transmission of rotational force between the spheres and the set screws.

37. A rotation imparting device subassembly for coupling to a bearing assembly to permit said subassembly to rotate, the subassembly, comprising:

a cylindrical shaft having at least two axially spaced uniformly, locally, and elastically expandble tapered conical shaft sections opening toward the respective ends of the shaft and being substantially concentric with the outside of the shaft, for localized annular engagement with the inner races of the bearing assembly; and spherical surfaces, mating with the walls of the conical sections of the shaft for providing radial force to uniformly and elastically expand the shaft into annular localized retentive contact with the bearing assembly about the point where the conical sections contact the spherical surfaces.

38. The device of claim 37 and further comprising axial force providing means coupled to the spherical surfaces for forcing the spherical surfaces into the conical section to expand the shaft about the spherical surfaces.

39. The device of claim 38 wherein the axial force providing means comprise set screws having flat surfaces acting on the spherical surfaces to provide axial force transmission without substantial transmissions of torque to the spherical surfaces.

40. The device of claim 39 wherein the shaft comprises threaded portions between each conical section and the ends of the shaft which mate with corresponding threaded portions of the set screws.

* * * * *